(12) United States Patent
Watanabe et al.

(10) Patent No.: US 8,536,756 B2
(45) Date of Patent: **\*Sep. 17, 2013**

(54) MOTOR AND ELECTRICAL EQUIPMENT EQUIPPED WITH SAME

(75) Inventors: Akihiko Watanabe, Osaka (JP);
Hirofumi Mizukami, Osaka (JP);
Takehiko Hasegawa, Osaka (JP);
Haruhiko Kado, Osaka (JP)

(73) Assignee: Panasonic Corporation, Osaka (JP)

( \* ) Notice: Subject to any disclaimer, the term of this patent is extended or adjusted under 35 U.S.C. 154(b) by 0 days.

This patent is subject to a terminal disclaimer.

(21) Appl. No.: 13/202,892

(22) PCT Filed: Feb. 26, 2010

(86) PCT No.: PCT/JP2010/001307
§ 371 (c)(1),
(2), (4) Date: Aug. 23, 2011

(87) PCT Pub. No.: WO2010/098123
PCT Pub. Date: Sep. 2, 2010

(65) Prior Publication Data
US 2012/0038229 A1    Feb. 16, 2012

(30) Foreign Application Priority Data

Feb. 26, 2009  (JP) .................. 2009-043362

(51) Int. Cl.
*H02K 5/15* (2006.01)
*H02K 11/00* (2006.01)

(52) U.S. Cl.
USPC ...... 310/196; 310/43; 310/68 R; 310/216.007

(58) Field of Classification Search
USPC ............... 310/43, 68 R, 72, 196, 216.007
See application file for complete search history.

(56) References Cited

U.S. PATENT DOCUMENTS 4,126,933 A \* 11/1978 Anderson et al. ............. 29/598
4,263,711 A \* 4/1981 Sakano et al. ................. 29/597
(Continued)

FOREIGN PATENT DOCUMENTS

GB    1508793 A    4/1978
JP    56-103938 A  8/1981
(Continued)

OTHER PUBLICATIONS

International Search Report for International Application No. PCT/JP2010/001307, dated Apr. 20, 2010, 2 pages.

(Continued)

*Primary Examiner* — Tran Nguyen
(74) *Attorney, Agent, or Firm* — Brinks Hofer Gilson & Lione

(57) ABSTRACT

A motor includes a stator having a stator iron-core on which a winding is wound, a rotor having a rotary body holding a permanent magnet opposed to the stator along a circumferential direction and a shaft joined to the rotary body such that it extends through the rotary body at the center, bearings supporting the shaft, two conductive brackets for fixing the bearings, and a printed circuit board on which a drive circuit for driving the winding is mounted. A dielectric layer is provided between an outer wall of the rotary body and the shaft, the two brackets are electrically connected together, and a capacitor is connected between the stator iron-core and the brackets for adjusting impedance.

13 Claims, 16 Drawing Sheets

(56) References Cited

U.S. PATENT DOCUMENTS

| | | | |
|---|---|---|---|
| 6,069,431 A * | 5/2000 | Satoh et al. | 310/260 |
| 6,528,916 B1 | 3/2003 | Naito et al. | |
| 2005/0253480 A1 | 11/2005 | Pizzichil | |
| 2007/0290570 A1 | 12/2007 | Okada et al. | |
| 2008/0042499 A1 | 2/2008 | Okada | |
| 2010/0253158 A1* | 10/2010 | Mizukami et al. | 310/43 |
| 2011/0043071 A1* | 2/2011 | Mizukami et al. | 310/216.121 |
| 2011/0234026 A1* | 9/2011 | Mizukami et al. | 310/43 |

FOREIGN PATENT DOCUMENTS

| | | | |
|---|---|---|---|
| JP | 2001-128431 A | | 5/2001 |
| JP | 2005-198374 A | | 7/2005 |
| JP | 2007-116839 A | | 5/2007 |
| JP | 2007116839 A | * | 5/2007 |
| JP | 2007-159302 A | | 6/2007 |
| JP | 2007-166813 A | | 6/2007 |
| JP | 2008-263698 A | | 10/2008 |
| JP | 2008-289272 A | | 11/2008 |
| WO | WO 2009/001546 A1 | | 12/2008 |
| WO | WO 2009/113311 A1 | | 9/2009 |

OTHER PUBLICATIONS

Extended European Search Report for European Application No. 10746006.5, dated Jul. 31, 2012, 10 pages.

* cited by examiner

FIG. 16

| | Comparison 1 | Comparison 2 | Comparison 3 | | Experiment 1 | | | Experiment 2 | Experiment 3 |
|---|---|---|---|---|---|---|---|---|---|
| | | | Sample 1 | Sample 2 | Sample 1 | Sample 2 | Sample 3 | | |
| Conduction between two brackets | N/A | N/A | Available | Available | Available | Available | Available | Available | Available |
| Connection between stator iron core and GND on printed circuit board | N/A | N/A | Available | Available | Available | Available | Available | Available | Available Connection via capacitor of 0.1μF |
| Resin thickness | No resin (0mm) | No resin (0mm) | No resin (0mm) | No resin (0mm) | 0.3mm | 0.3mm | 0.3mm | 2.5mm | 2.5mm |
| Capacity of the capacitor connected Between stator iron-core and bracket | Short | No short (0pF) | No short (0pF) | 40pF | No short (0pF) | 100pF | 115pF | 230pF | 230pF |
| Bearig on output shaft side | Axial voltage (V) | 17 | 14 | 8 | 3 | 8 | 1 | 1 | 1 | 1 |
| | State of axial voltage waveform | Completely collapse | Completely collapse | Partially collapse | Free from collapse | Free from collapse | Free from collapse | Free from collapse | Free from collapse | Free from collapse |
| | Heading of the waveform | downward | upward | downward | downward | downward | downward | upward | downward | downward |
| | Voltage direction | negative | positive | nagative | nagative | nagative | negative | positive | nagative | nagative |
| | Voltage (V) between grounding wire and shaft | 214 | 176 | 66 | 56 | 65 | 37 | 36 | 21 | 21 |
| Bearing on counter output shaft side | Axial voltage (V) | 22 | | | | | | | | |
| | State of axial voltage waveform | Completely collapse | ditto | ditto | ditto | ditto | ditto | ditto | ditto | ditto |
| | Heading of the waveform | upward | | | | | | | | |
| | Voltage direction | positive | | | | | | | | |
| | Voltage (V) between grounding wire and shaft | 278 | | | | | | | | |
| Anti-electric-erosion test(h) | ≤500 | 500~1000 | 1000≤ | 3000≤ | 1500≤ | 4500≤ | 4000≤ | 4500≤ | 4500≤ |

MOTOR AND ELECTRICAL EQUIPMENT EQUIPPED WITH SAME

TECHNICAL FIELD

The present invention relates to a motor and electrical equipment including the same motor, more particularly, it relates to a motor which is improved such that electric erosions on the bearings can be prevented, and electrical equipment equipped with the same motor.

BACKGROUND ART

In recent years, motors driven by the inverter of PWM (Pulse Width Modulation) method have prevailed in the market. In the case of the motors driven by the PWM inverters, an electric potential at the neutral point of the winding cannot be 0 (zero), so that an electric potential difference (hereinafter referred to as an axial voltage) is generated between the outer ring and the inner ring of the bearing. The axial voltage contains a high-frequency component produced by a switching operation. When the axial voltage reaches a dielectric breakdown voltage of the oil film inside the bearing, a micro electric current runs in the bearing, thereby inviting an electric erosion in the bearing. A progress of the electric erosion will result in wavy abrasion on the inner ring, the outer ring, or the balls of the bearing, and the wavy abrasion sometimes incurs an abnormal sound. The electric erosion is thus one of chief factors causing defects of the motor.

The drive circuit (including a control circuit and others) used in the inverter for driving the motor by the PWM method includes a power supply circuit, which is electrically insulated from both of the primary side circuit thereof and a grounding of the primary side circuit.

The following measures have been taken for preventing the electric erosion:

(1) The inner ring and the outer ring of the bearing are made conductive with each other.

(2) The inner ring is insulated from the outer ring of the bearing.

(3) The axial voltage is lowered.

Method (1) employs, e.g. a conductive lubricant for the bearing. However, the conductive lubricant lowers the conductivity with the lapse of time, and is short of reliability in slide action. A brush can be mounted on a rotary shaft for making the inner ring and the outer ring conductive; however, this method incurs abrasion dust of the brush and requires a space for the brush.

Method (2) employs, e.g. non-conductive ceramic balls inside the bearing instead of iron balls; however, this method is expensive although a high anti-erosion effect can be expected. This method thus cannot be used for general-purpose motors.

Method (3), e.g. electrically shorts a stator iron-core to a conductive metallic bracket, thereby varying an electrostatic capacity for lowering the axial voltage. This method is a public domain and disclosed in, e.g. Patent Literature 1.

Various art has been disclosed for suppressing the electric erosion of the bearing of the motor, for instance, a structure in which a stator iron-core of the motor is grounded.

Patent Literature 1 discloses that the stator iron-core is electrically shorted to the bracket for lowering impedance of the stator, thereby preventing the electric erosion on the bearing.

To be more specific, the motors used in devices operated in a wet area, e.g. washing machine and dish washer, have a risk of inviting an electric shock, so that not only an insulation on a charging section (primary insulation) but also an independent insulation (hereinafter referred to as an additional insulation) is needed. On the other hand, the other motors used in an indoor unit or an outdoor unit of the air-conditioner, a water heater, or an air-cleaner have no risk of the electric shock, so that the additional insulation is not needed. The motors to be used in the indoor unit or outdoor unit of the air-conditioner, the water heater, or the air-cleaner thus include the rotors not insulated, so that the impedance on the rotor side (inner ring side of the bearing) stays low, while the impedance on the stator side (outer ring side of the bearing) stays high. In this case, a difference in voltage drop is produced, namely, the electric potential on the inner ring side is high while that on the outer ring side is low, so that they fall into an unbalanced state of the impedance, and such a high axial voltage may invite an electric erosion to the bearing.

In order to avoid the foregoing problem, Patent Literature 1 discloses a method of lowering the impedance on the stator side (outer ring side) for the impedance to approximate an impedance on the rotor side (inner ring side). This method can be achieved by electrically shorting the iron core of the stator to the bracket.

In recent years, a mold motor has been proposed for improving the reliability, to be more specific, a stationary member such as an iron core of a stator is molded of a mold-material. The bearing is then fixed with such an insulating mold-material instead of the metallic bracket for suppressing an unneeded high-frequency electric current produced on the outer ring side or an unneeded high frequency electric current flowing between the inner ring and the outer ring of the bearing. However, such mold-material is made of resin, so that its strength is not enough for fixing the bearing, and resin-mold cannot expect highly accurate dimensions. As a result, malfunctions caused by creep tend to occur in the bearing. To be more specific, in a case where a space is available between the outer ring of the bearing and the inner wall of the housing, transfer load produces force on the shaft in the radial direction. This force induces a sliding phenomenon due to a relative difference along the radial direction, and the sliding phenomenon is called "creep". The "creep" can be suppressed, in general, by fixing the outer ring firmly to the housing, e.g. bracket. In recent years, the motor has been expected to output a greater power, so that the bearing needs to be fixed more firmly. To meet these needs, it is essential to take measures against the creep, e.g. a metal bracket made of steel plate excellent in dimensional accuracy is employed for fixing the bearing. The rotary shaft is, in general, supported by the bearings at two places, and the two bearings are preferably fixed with the metal brackets because of the strength as discussed above and an ease of implementation.

The conventional method disclosed in Patent Literature 1; however, encounters the following problem: This conventional method uses a shorting, so that it is impossible to adjust the impedance, and a structure or magnet material of the rotor sometimes raises the axial voltage. Here is another problem, i.e. since this method aims at lowering the impedance, the inner ring and the outer ring of the bearing are always kept balance with respect to the impedance in a state of high electric potential. In such a state, if the impedance loses the balance due to a working condition of the motor or due to dispersion in accuracy of assembling the stator with the rotor, the axial voltage rises opposing to the aim, so that the electric erosion may tend to occur.

Use of the conductive bracket on the counter output shaft side may cause the impedance to be lower than that in the case of using a bracket made of insulating resin. In other words, the housing made of resin exerts powerful insulating performance, so that no electric current flows between the inner ring and the outer ring of the bearing; however, the use of the conductive bracket lowers the insulating performance, so that an electric current flows between the inner ring and the outer ring. The counter output shaft side thus also tends to invite an electric erosion.

Patent Literature 1: Unexamined Japanese Patent Application Publication No. 2007-159302

DISCLOSURE OF INVENTION

A motor of the present invention comprises the following structural elements:

a stator including a stator iron-core having a winding wound thereon;

a rotor including a rotary body holding a permanent magnet confronting the stator along a circumferential direction and a shaft joined to the rotary body such that it extends through the rotary body at the center;

a bearing supporting the shaft;

two conductive brackets for fixing the bearing; and a printed circuit board having a drive circuit mounted thereon for driving the winding.

In the foregoing structure, the rotary body is provided with a dielectric layer between an outer wall and the shaft, and the two brackets are electrically connected together, and yet, an impedance adjusting member is connected between the stator iron-core and the brackets for adjusting the impedance.

The dielectric layer, having some electrostatic capacity and provided between the shaft and the outer wall of the rotary body, allows forming a structure equivalent to a series connection of the electrostatic capacities in the rotor of low impedance, so that the impedance on the rotor side can be raised to approximate the high impedance on the stator side. As a result, the inner ring and the outer ring of the bearing can be kept balance with respect to the high-frequency electric potential. Since the stator and the rotor are in the high impedance state, the inner ring and the outer ring of the bearing can be kept balance in a low electric potential state, so that the axial voltage can be suppressed free from being affected by the working condition of the motor. As discussed above, the bearing fixed with the conductive bracket allows lowering the difference in electric potential between the inner ring and the outer ring of the bearing, so that an electric erosion, produced by the high-frequency due to the PWM, can be prevented from occurring to the bearing while the strength of fixing the bearing is maintained. On top of that, the connection of the impedance adjusting member between the stator iron-core and the bracket allows with ease a fine-adjustment of the impedance on the stator side. The impedance on the stator side thus can be appropriately matched such as it can be approximated to or identical to that of the rotor side. This impedance matching allows the electric potentials of the inner ring and the outer ring of the bearing to be further approximated to each other or to be identical, so that the axial voltages of the respective bearings can be lowered. The electrical connection of the two brackets makes both of the brackets stay at the same electric potential, whereby an impedance adjustment can be done only for either one of the brackets. The axial voltages of the two bearings can be thus lowered with a simple structure.

Electrical equipment of the present invention employs the motor discussed above. When an abnormality occurs in an internal voltage, this structure allows a protection to stop supplying the abnormal voltage only to a particular control circuit related to the safety, thereby preventing the particular control circuit from breaking down caused by the abnormal voltage. On top of that, when the particular control circuit is assigned to, e.g. a motor drive circuit, the motor can be prevented from an abnormal running caused by the abnormal voltage, so that the safety can be maintained.

The motor of the present invention as discussed above can lower the axial voltage. The present invention thus provides not only a motor of which bearing is prevented from an electric erosion, but also electrical equipment equipped with the same motor.

BRIEF DESCRIPTION OF THE DRAWINGS

FIG. 16 shows evaluation results of the respective experiments and the comparison samples.

DETAILED DESCRIPTION OF THE PREFERRED EMBODIMENTS

Exemplary embodiments of the motor and the electrical equipment equipped with the same motor are demonstrated hereinafter with reference to the accompanying drawings.

First Exemplary Embodiment

Figure 1:
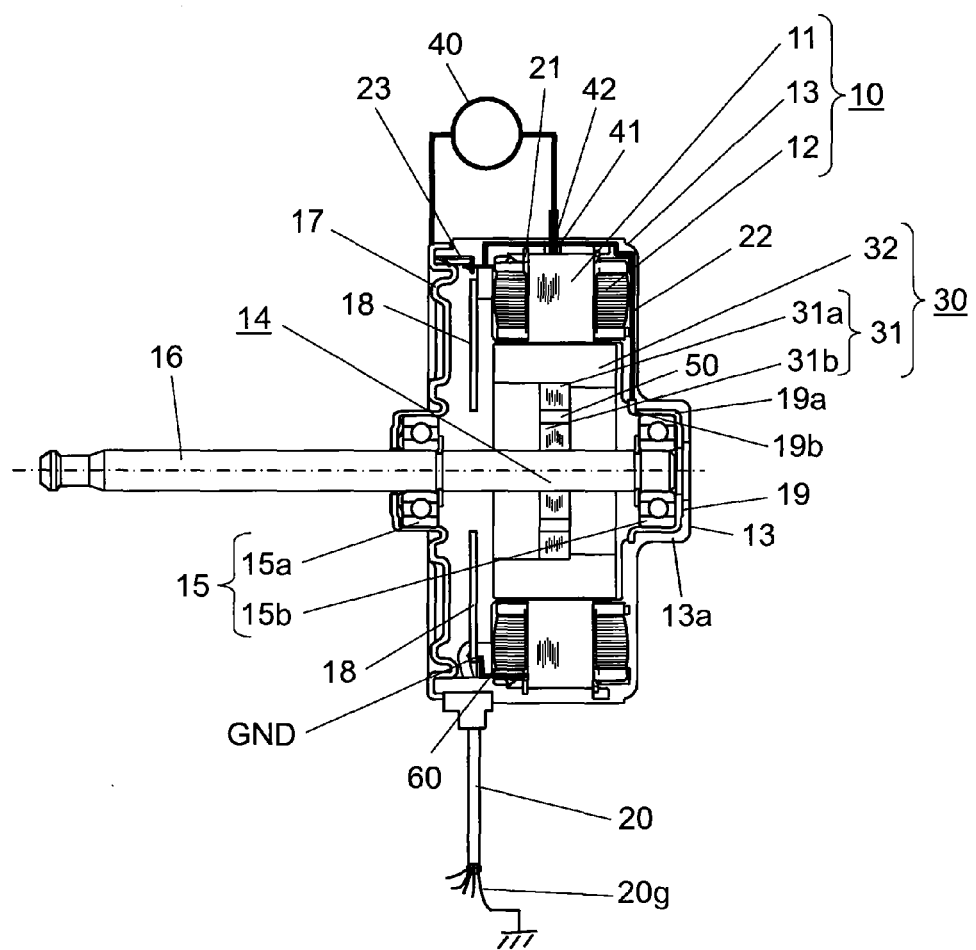
FIG. 1 is a sectional view illustrating a structure of a motor in accordance with a first embodiment of the present invention.

FIG. 1 is a sectional view of a structure of a motor in accordance with the first embodiment of the present invention. In this embodiment, the motor is mounted in electrical equipment, e.g. air conditioner, and the motor is used for driving a blowing fan. The motor used in this embodiment is an inner-rotor type which places a rotor rotatably inside a stator, and is a brushless motor including a permanent magnet in the rotor. The motor of the present invention is not limited to the foregoing instance.

In FIG. 1, stator iron-core 11 is wound with stator windings 12 via insulator 21 made of resin and insulating iron-core 11, which is molded by insulating-resin 13 (molding material) together with other stator members. These members are molded together into one body so that stator 10, of which outer appearance looks like a cylindrical shape, can be formed.

Rotor 14 is inserted inside stator 10 via a space, and rotor 14 is formed of disc-like rotary body 30 including rotor iron-core 31 and shaft 16 joined to rotary body 30 such that shaft 16 extends through rotary body 30 at the center. Rotary body 30 holds permanent magnet 32, made of ferrite resin magnet, along the circumferential direction and confronting the inner wall of stator 10.

Figure 2:
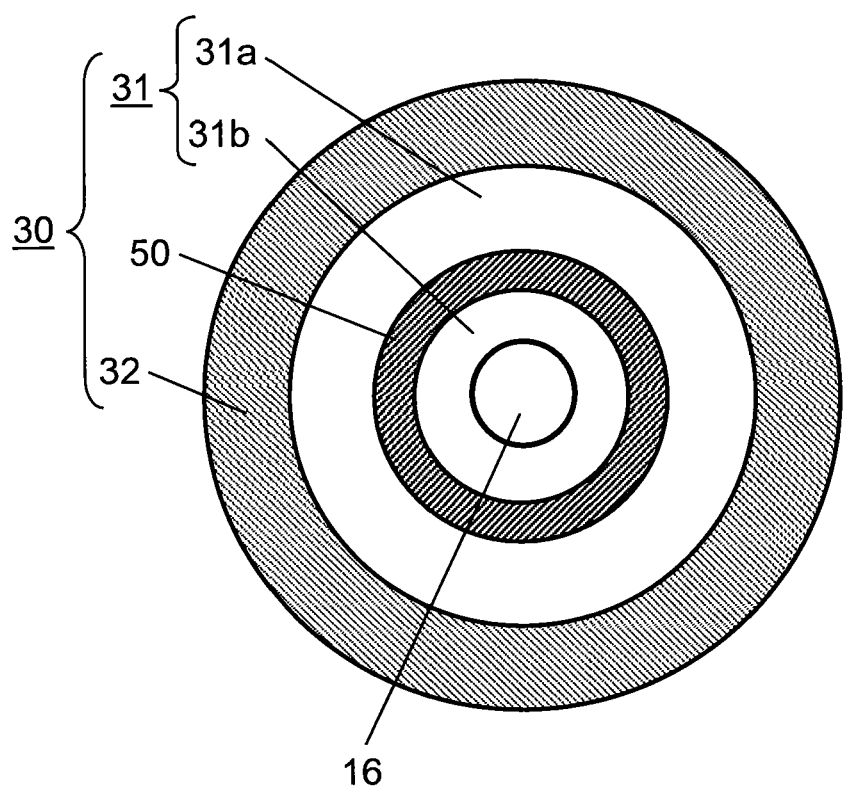
FIG. 2 shows a structure of a rotary body of the motor.

FIG. 2 shows a structure of rotary body 30 of the motor in accordance with the first embodiment, and the structure shown in FIG. 2 is viewed along the longitudinal direction of shaft 16. Rotary body 30 is formed of, as shown in FIG. 1 and FIG. 2, permanent magnet 32 placed at the outer most periphery, outer iron-core 31a forming an outer wall of rotor iron-core 31, dielectric layer 50, inner iron-core 31b forming an inner wall of rotor iron-core 31. These elements are placed in this order from the outer rim toward shaft 16. The structure of rotary body 30 shown in FIG. 1 and FIG. 2 is formed by molding iron-core 31, dielectric layer 50, and permanent magnet 32 together into one body. The outer wall of this rotary body 30 confronts the inner wall of stator 10.

Shaft 16 of rotor 14 is supported by two bearings 15 which contain multiple iron-balls and shapes like a cylinder. The inner ring side is fixed to shaft 16. As shown in FIG. 1, bearing 15a support shaft 16 at the output shaft side which protrudes from the brushless motor, and bearing 15b support shaft 16 at the other side (hereinafter referred to as counter output shaft side). These bearings 15 are fixed by conductive metal brackets at their outer ring sides. As shown in FIG. 1, bearing 15a on the output shaft side is fixed by bracket 17, and bearing 15b on the counter output shaft side is fixed by bracket 19. Shaft 16 is thus supported by two bearings 15, whereby rotor 14 can rotate.

On top of that, this brushless motor includes printed circuit board 18 to which a drive circuit is mounted, and the drive circuit contains a control circuit. The drive circuit includes an inverter of a PWM method. Printed circuit board 18 is built in the brushless motor, and then bracket 17 is press-fitted into stator 10, thereby forming the brushless motor. Printed circuit board 18 is hooked up to connection wires 20 including, e.g. lead-wires for applying power supply voltage Vdc of the windings, power supply voltage Vcc of the control circuit, and control voltage Vsp for controlling the rpm, and also grounding wire 20g, which is connected to the ground GND on board 18. Ground GND is a reference point of zero electric potential on board 18. This reference point is used for setting a reference electric potential at 0 (zero) volt, so that a wiring pattern as the ground wiring is prepared on board 18. To be more specific, grounding wire 20g included connection wires 20 is connected to the ground wiring on board 18. In the brushless motor in accordance with this embodiment, stator iron-core 11 is electrically connected via continuity member 60 to the ground wiring that is the reference point of zero potential on board 18.

The ground GND on printed circuit board 18, to which the drive circuit is mounted, is insulated from the earth ground and the primary side (power supply) circuit, so that the ground GND is in a floating state from the earth ground and the primary side circuit relative to the electric potential. Ground wiring 20g of connection wires 20 is connected to the ground wiring that is the reference point of zero electric potential. The power supply circuit for supplying a power supply voltage to the winding connected to printed circuit board 18 to which the driving circuit is mounted is electrically insulated from the primary side (power supply) circuit relative to this power supply circuit; the primary side (power supply) circuit relative to the power supply circuit that supplies a power supply voltage to the control circuit; the earth ground connected to these primary side circuits; and independent earth grounds. The power supply circuit for supplying the power supply voltage to the control circuit is also electrically insulated from the foregoing circuits and the groundings discussed above. The lead wires for applying the control voltages and the ground wires of the control circuits are also electrically insulated from those circuits and the grounding discussed above. In other words, the drive circuit mounted to board 18 is electrically insulated from the electric potential of the primary side circuits and that of the earth ground, so that the electrical potential of the drive circuit is in a floating state. This is also referred to as the electric potential being floated, and this expression is well known. The structure of the power supply circuit for the windings connected to board 18 and that for the control circuit is called as a floating power supply, and this expression is also well known.

In this embodiment, conductive pin 22 insulated from external objects and stator iron-core 11 is electrically connected to bracket 19, and then integrally molded into insulating resin 13. An end of conductive pin 22 is exposed from insulating resin 13 at the end of the output shaft side of stator 10. The end of pin 22 is hooked up to another conductive pin 23 for electrically connecting to bracket 17. When bracket 17 is press-fitted into stator 10, this structure allows maintaining the conduction between bracket 17 and pin 23. The structures discussed above achieve an electrical connection between bracket 17 and bracket 19 while brackets 17 and 19 are insulated from stator iron-core 11 within the motor.

In this embodiment, capacitor 40, i.e. a dielectric element, is electrically connected as an impedance-adjusting member between stator iron-core 11 and bracket 17. Capacitor 40 is thus connected between iron-core 11 and bracket 17, where core 11 and bracket 17 are electrically insulated from each other. Capacitor 40 works as a matching member for matching the impedance between iron-core 11 and an inner ring of the bearing 15 to the impedance between iron-core 11 and an outer ring of the bearing 15. In order to implement the foregoing connection, insulating resin 13 working as a molding member is provided with through-hole 41, and connection pin 42 connected to stator iron-core 11 extends through hole 41 so that an end of pin 42 can protrude from hole 41. Capacitor 40 is connected to connection pin 42 at the first end, and connected to bracket 17 at the second end.

The respective power supply voltages and control signals are supplied through connection wires 20 to the brushless motor discussed above, and stator windings 12 are driven by the drive circuit mounted to printed circuit board 18. The drive of stator windings 12 prompts a drive current to flow through windings 12, and then iron-core 11 produces a magnetic field. The magnetic field from iron core 11 and the magnetic field from permanent magnet 32 produce attractive force and repulsive force in response to the polarities of the magnetic fields, and those forces rotate rotor 14 on shaft 16.

The brushless motor in accordance with the first embodiment is detailed hereinafter. As discussed previously, shaft 16 is supported by two bearings 15, which are fixed by the brackets. To suppress the defects caused by the creep, respective bearings 15 are fixed by conductive metal brackets. To be more specific, conductive brackets excellent in dimensional accuracy are formed of steel plate, and these bracket are used in bearings 15. In the case where a higher output is required of the motor, this structure is preferred.

To be more specific, bearing 15b on the counter output shaft side is fixed by bracket 19 of which diameter is almost equal to the outer diameter of bearing 15b. Bracket 19 is integrally molded with insulating resin 13. As shown in FIG. 1, insulating resin 13 on the counter output shaft side thus forms motor projection part 13a that projects from the motor body in the counter output shaft direction. Inside motor projection part 13a, bracket 19 is placed as an inner bracket, and is molded integrally with insulating resin 13. Bracket 19 is shaped like a cup, i.e. hollow cylindrical shape, to be more specific, bracket 19 has cylindrical section 19a with an open-end and annular brim section 19b slightly flared outward from the open-end. The inner diameter of cylindrical section 19a is almost equal to the outer diameter of bearing 15b. A press-fit of bearing 15b into cylindrical section 19a allows fixing bearing 15b to insulating resin 13 via bracket 19. This structure allows fixing bearing 15b to metal bracket 19 at the outer ring side, whereby the defects caused by the creep can be suppressed. An outer diameter of brim section 19b is slightly greater than that of bearing 15b, namely, the outer diameter of brim section 19b is greater than the outer diameter of bearing 15b and yet it is smaller than at least an outer diameter of rotary body 30. The foregoing shape of bracket 19 allows using a smaller amount of the expensive material, i.e. metal, than a structure where a brim section extends over the outer wall of rotary body 30 and goes as far as stator 10. On top of that, the area of metal bracket 19 is thus restricted, and the outer shell of bracket 19 is covered with insulating resin 13 by integral molding, whereby the noises produced by bearing 15b can be reduced.

Next, bearing 15a on the output shaft side is fixed by bracket 17 of which outer diameter is almost equal to that of stator 10. Bracket 17 is shaped like a disc, and has a projection section at the center of the disc. The projection section is hollow inside and has an outer diameter almost equal to that of bearing 15a. After printed circuit board 18 is built in the motor, the projection section is press-fitted into bearing 15a at the inside of the projection section of bracket 17, and bracket 17 is press-fitted into stator 10 such that a connection terminal provided to the outer wall of bracket 17 can be fit to the connection terminal of stator 10. The brushless motor is thus formed. This structure will ease the assembling work, and reduce the defects caused by the creep because bearing 15a is fixed to metal bracket 17 at the outer ring side.

Bracket 19 is electrically hooked up to conductive pin 22 in advance. As shown in FIG. 1, conductive pin 22 is connected to brim section 19b of bracket 19 at a first end. Pin 22 is placed inside insulating resin 13 and molded integrally with insulating resin 13 as bracket 19 is. Placement of conductive pin 22 inside insulating resin 13 allows protecting pin 22 from rust or external force, and thus forms a reliable electrical connection with respect to the working environment and external stress. In insulating resin 13, conductive pin 22 extends from brim section 19b toward the outer wall of the motor, and further extends from around the outer wall of the motor toward the output shaft side almost in parallel with shaft 16. The other end of pin 22 is exposed from the insulating resin 13 at the end of the output shaft side. This exposed end of pin 22 is hooked up to another conductive pin 23 for electrically connecting pin 22 to bracket 17. In other words, when bracket 17 is press-fitted into stator 10, conductive pin 23 touches bracket 17 so that the conduction between bracket 17 and conductive pin 23 can be maintained. This structure allows an electrical connection between bracket 17 and bracket 19 via conductive pin 22 while these brackets are insulated from stator iron-core 11 by insulating resin 13.

Figure 3:
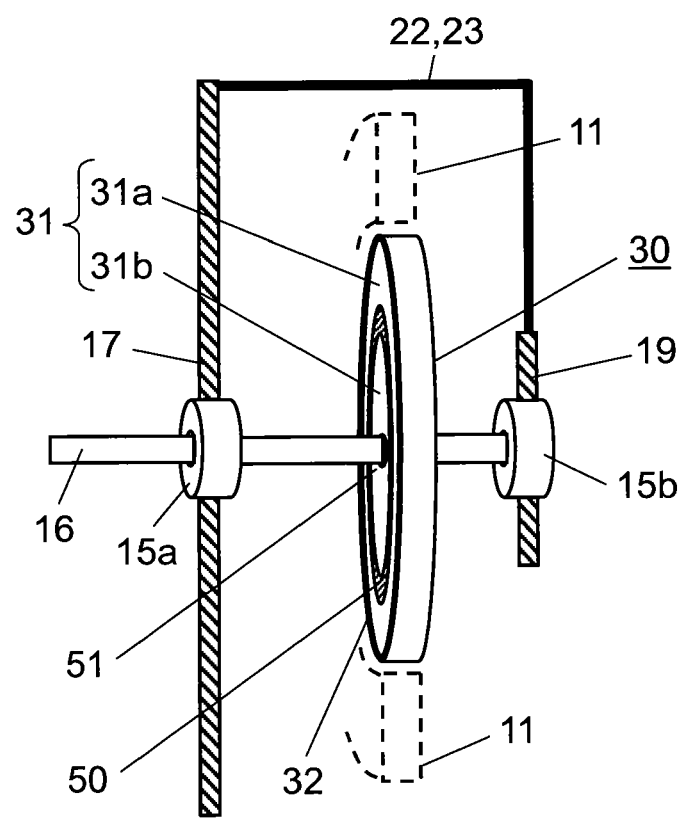
FIG. 3 shows an essential part of the motor.

Next, Rotary body 30 is detailed hereinafter. In this embodiment, as discussed previously, dielectric layer 50 is formed between shaft 16 and an outer wall of rotary body 30. FIG. 3 shows an essential part of the motor in accordance with the first embodiment. FIG. 3 schematically illustrates the essential part of the brushless motor shown in FIG. 1. Bracket 17 and bracket 19 are electrically connected together, and they are not connected to stator iron-core 11.

In a case where bracket 17 is not connected to bracket 19, both the brackets differ from each other in shape and in placement, so that they have different amounts of impedance. An electric potential induced on bracket 17 is imbalanced with that induced on bracket 19. This first embodiment electrically connects bracket 17 and bracket 19 together for throwing them at the same electric potential, thereby suppressing the imbalance in electric potential.

A connection of conductive pin 22, which connects bracket 17 and bracket 19 together, to stator iron-core 11 will lower the impedance on the stator side. A lower impedance on the stator side will raise the electric potential of the stator side, namely on the outer ring side of the bearing as discussed above. However, this first embodiment isolates conductive pin 22 from stator iron-core 11 for preventing the impedance from extremely decreasing, so that the electric potential on the outer ring side of the bearing is regulated at a lower level. This structure allows keeping balance with ease in the impedance between the stator and the rotor. The reason is detailed hereinafter. On top of that, the presence of capacitor 40 allows a fine adjustment of the impedance between the stator and the rotor. The reason is also detailed hereinafter. Throwing of both the brackets at the same electric potential will allow adjusting the impedance one of the brackets only. The impedance adjusting member thus can be hooked up to only one of the brackets, whereby the axial voltage can be regulated at a low level relative to the two bearings.

As shown in FIG. 3, rotary body 30 includes permanent magnet 32 at the outer most circumference, outer iron-core 31a forming an outer wall of rotor iron-core 31, dielectric layer 50, inner iron-core 31b forming an inner wall of rotor iron-core 31. These elements are placed in this order from the outer rim toward the inside. Dielectric layer 50 is formed of insulating resin and is provided in order to suppress the electric erosion. FIG. 3 shows an example where dielectric layer 50 is shaped like a ring which circulates around shaft 16 and between the inner wall and the outer wall of rotary body 30. As discussed above, rotary body 30 is integrally formed of permanent magnet 32, outer iron-core 31a, the insulating resin forming dielectric layer 50, and inner iron-core 31b. Rotary body 30 is joined to shaft 16 at fastening section 51 formed on the inner wall of inner iron-core 31b. Rotor 14 supported by bearings 15 is thus formed.

Dielectric layer 50 of rotary body 30 is formed of insulating resin, and isolates outer iron-core 31a from inner iron-core 31b in a series manner, while dielectric layer 50 is formed of the insulating resin having a given dielectric constant, so that a high-frequency electric current can flow between outer iron-core 31a and inner iron-core 31b.

In a case where no dielectric layer 50 is provided, the impedance between the two brackets is high relative to the stator iron-core, while the impedance of the shaft electrically connected to the rotary body is low. The high-frequency electric current of PWM generated from the stator iron-core flows into an equivalent circuit having the foregoing impedance components. As a result, a difference in electric potential caused by the high-frequency electric current is produced between the outer ring of the bearing and the shaft, i.e. the inner ring side of the bearing.

In this embodiment, the presence of dielectric layer 50 shown in FIG. 3 within the rotary body of the rotor having low impedance makes the impedance of rotor 14 high, namely, makes it approximate the impedance on the bracket side. In other words, providing dielectric layer 50 between outer iron-core 31*a* and inner iron-core 31*b* allows making rotor 14 equivalent to a structure having a series connection of the electrostatic capacities of dielectric layer 50 and others. The impedance of rotor 14 thus scan be increased. The greater impedance of rotor 14 will increase a voltage drop in the high-frequency electric current flowing from rotary body 30 to shaft 16. The electric potential generated on shaft 16 by the high-frequency electric current can be thus lowered. Based on the foregoing principle, the brushless motor in accordance with this first embodiment lowers the difference in electric potential between the outer ring of bearings 15 and shaft 16, i.e. the inner ring side of bearing 15. In this case the outer ring is electrically connected to brackets 17 and 19.

Next, capacitor 40 connected between stator iron-core 11 and bracket 17 is detailed hereinafter. Rotary body 30 structured above allows the impedance of rotor 14 to increase and approximate the higher impedance on the bracket side. A change in width or in dielectric constant of dielectric layer 50 allows adjusting the impedance on rotor 14 side. However, these changes require a change in shape or of material of rotary body 30, so that these changes cannot be done with ease. Capacitor 40 is thus provided in order to finely adjust the impedance with ease.

To be more specific, stator iron-core 11 is connected to bracket 17 via capacitor 40. This connection needs this structure: First, provide through-hole 14 to insulating resin 13 on a side face of stator iron-core 11 so that part of iron-core 11 can be exposed, then connect a first end of connection pin 42 to the exposed part of iron-core 11 via through-hole 14. Connect a second end of pin 42 to a first end of capacitor 40, and then connect a second end of capacitor 40 to bracket 17.

As discussed above, since brackets 17 and 19 are not connected directly to stator iron-core 11, the impedance on the bracket side stays high. However, an adjustment of the impedance of capacitor 40 will lower the impedance on the brackets side appropriately. The foregoing structure thus allows adjusting the impedance on the bracket side more appropriately, so that the impedance of rotor 14 and the impedance of the brackets can be matched such that they can approximate each other or can be the same. This impedance matching allows almost equalizing the electric potentials of respective inner rings of bearings 15 to the electric potentials of respective outer rings thereof. The axial voltage can be thus lowered relative to bearing 15*a* and bearing 15*b*. In other words, the difference in electric potential between the inner ring and the outer ring of the bearing, namely, the axial voltage, can be lowered relative to bearing 15*a* fixed by conductive bracket 17 and bearing 15*b* fixed by conductive bracket 19. As a result, the electric erosion, invited on the bearings by the high-frequency current due to the PWM, can be reduced while the strength of fixing the bearings can be maintained.

An adjustment of the electrostatic capacities or resistances of capacitor 40 and dielectric layer 50 will allow adjusting the axial voltage between the shaft or the inner ring and the bracket or the outer ring of the bearing toward the negative direction relative to the bracket side. This adjustment allows the electric erosion to occur on the outer ring rather than on the inner ring. In other words, since an area of ball transferring face is greater on the outer ring side than on the inner ring side, the foregoing structure effects the reduction in the electric erosions more efficiently.

The instance discussed above connects an end of capacitor 40, working as an impedance-adjusting member, to bracket 17; however, the end of capacitor 40 can be connected to bracket 19, conductive pin 22, or conductive pin 23 instead of bracket 17. The impedance-adjusting member is not limited to a dielectric element, i.e. capacitor, but it can be at least one of the dielectric element or a resistance element. Multiple impedance-adjusting members discussed above can be used for connecting stator iron-core 11 to bracket 17, bracket 19, conductive pin 22, or conductive pin 23.

Next, the structure, in which stator iron-core 11 is electrically connected to ground GND on printed circuit board 18, is detailed hereinafter. In addition to the structure previously discussed, stator iron-core 11, which is a chief source of high-frequency signals causing the axial voltage, is electrically connected via continuity member 60 to grounding-wire 20*g* on printed circuit board 18 at ground GND. This simple structure allows the electric potential of stator iron-core 11 to be zero, whereby the high-frequency signals produced in iron-core 11 can be attenuated. The electric potential of the high-frequency signal induced from iron-core 11 to the inner ring and the outer ring of the bearing can be thus suppressed, thereby further suppressing the axial voltage and reducing the energy of producing the electric erosions. Instead of the structure where stator iron-core 11 is directly connected to grounding wire 20*g*, iron-core 11 can be connected to wire 20*g* via a dielectric element, e.g. a capacitor. In the case of direct connection of iron-core 11 to grounding wire 20*g*, iron-core 11 is also connected via wire 20*g* to the grounding of the electrical equipment to which the brushless motor is mounted. In such a case, a high-frequency signal generated in stator iron-core 11 might be transmitted as a noise to the electrical equipment. The presence of a capacitor between iron-core 11 and wire 20*g* will thus suppress the signal level of the high-frequency signal transmitted via wire 20*g* to the electrical equipment.

As discussed previously, the motor in accordance with the first embodiment of the present invention comprises the following structural elements:

a stator including a stator iron-core on which a winding is wound;

a rotor including a rotary body holding a permanent magnet opposed to the stator along a circumferential direction and a shaft joined to the rotary body such that it extends through the rotary body at the center;

a bearing supporting the shaft;

two conductive brackets for fixing the bearing; and a printed circuit board on which a drive circuit for driving the winding is mounted.

In the foregoing structure, a dielectric layer is provided between an outer wall of the rotary body and the shaft, and the two brackets are electrically connected together, and yet, an impedance-adjusting member is connected between the stator iron-core and the brackets for adjusting the impedance.

The dielectric layer, having some electrostatic capacity, provided between the shaft and the outer wall of the rotary body allows forming a structure equivalent to a series connection of the electrostatic capacities in the rotor of low impedance, so that the impedance on the rotor side can be raised to approximate the high impedance on the stator side. As a result, the inner ring and the outer ring of the bearing can be kept balance with respect to the high-frequency electric potentials. Since the stator and the rotor are in the high impedance state, the inner ring and the outer ring of the bearing can be kept balance in a low electric potential state, so that the axial voltage can be suppressed free from being affected by the working condition of the motor. Throwing of both the brackets at the same electric potential allows a difference in the electric potential between the inner ring and the outer ring of the first bearing to approximate a difference in the electric potential between the inner ring and the outer ring of the second bearing, or allows these differences to be null. As discussed above, the bearing fixed with the conductive bracket allows lowering the difference in electric potential between the inner ring and the outer ring of the bearing. On top of that, the connection of the impedance adjusting member between the stator iron-core and the bracket allows with ease a fine-adjustment of the impedance on the stator side. The impedance on the stator side thus can be appropriately matched such as it can be approximated to or identical to that of the rotor side. This impedance matching allows the electric potentials of the inner ring and the outer ring of the bearing to be further approximated to each other or to be identical, so that the axial voltages of the respective bearings can be lowered. Since the two brackets are thrown into the same electrical potential, an impedance adjustment can be done only for either one of the brackets. The axial voltages of the two bearings can be thus lowered with the foregoing simple structure.

In addition to the foregoing structure, the stator iron-core is electrically connected to the ground, i.e. a reference point of the zero electric potential, on the printed circuit board. This structure throws the stator iron-core into the zero electric potential, thereby reducing the high-frequency component radiated from the iron-core, and the axial voltage can be thus lowered. As a result, the electric erosion can be suppressed more efficiently.

The motor of the present invention thus allows appropriately suppressing the electric erosions invited on the bearing by the high-frequency current due to PWM while the strength of fixing the bearings can be maintained.

The foregoing first exemplary embodiment is further detailed with reference to the following experiments. The present invention is not limited to these experiments.
Experiment 1

With the structure shown in FIG. 1, dielectric layer 50 employs PBT resin of which dielectric constant is 3.6, and it is shaped like a cylinder as shown in FIG. 2. The resin is 0.3 mm thick along the radial direction. Stator iron-core 11 is connected via continuity member 60 to the point of zero electric potential, i.e. ground GND, on printed circuit board 18. Two motors are prepared, one includes capacitor 40 of 100 pF and the other one includes capacitor 40 of 115 pF. The axial voltages and the voltages between ground GND and the shaft of those two motors are measured.

Bearing 15 employs Minebea 608 (manufactured by Minebea Co., Ltd.) and the grease having consistency of 239. Permanent magnet 32 employs a ferrite resin magnet, insulating resin 13 employs a molding material of unsaturated polyester resin, stator iron-core 11 and rotor iron-core 31 employ laminated electromagnetic steel sheets, and insulator 21 is made of PBT resin.

When the axial voltages are measured, the following conditions are prepared for the two motors equally: Use a stabilized DC power supply, set power supply voltage Vdc of the winding at 391V, set power supply voltage Vcc of the control circuit at 15V, and set the rpm of the motors at 1000 r/min. The rpm is adjusted by control voltage Vsp, and the motors in operation are in the attitude of keeping the shafts horizontally.

Figure 4:
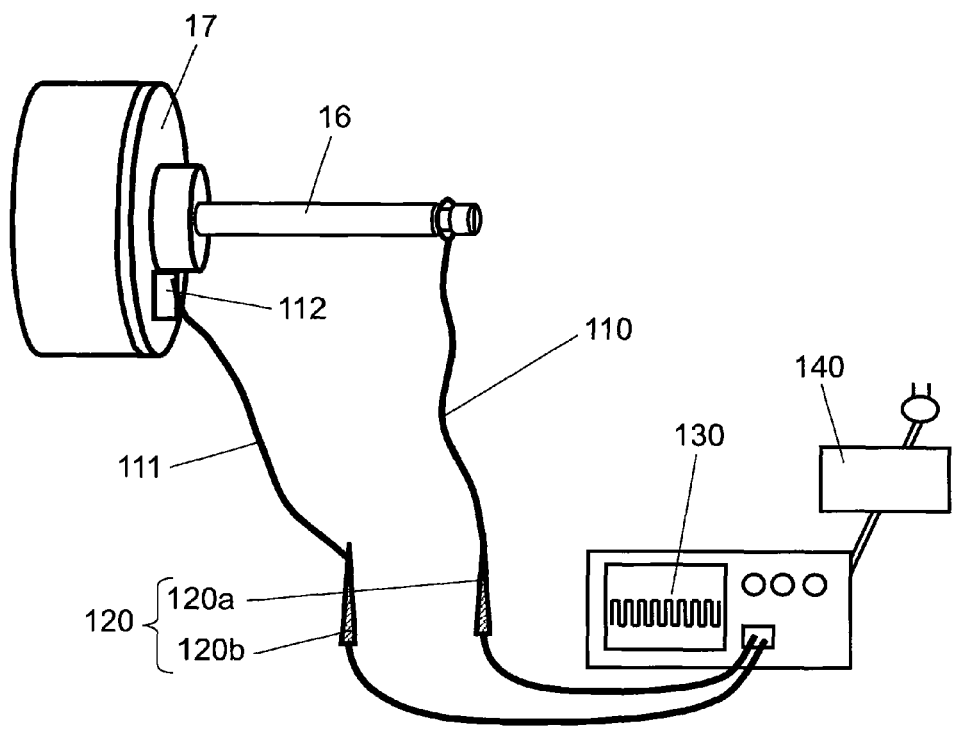
FIG. 4 illustrates a method of measuring an axial voltage of first experiment.

FIG. 4 shows a method of measuring the axial voltages in experiment 1. Voltage waveforms are observed with digital oscilloscope 130 (Tektronix Model DP07104) and high-voltage differential probe 120 (Tektronix Model P5205) for confirming whether or not the waveforms are collapsed, and then peak-to-peak voltages are measured as the axial voltages.

The waveform collapses of the axial voltages are divided into three ranks, namely, complete collapse, partial collapse, and no collapse.

Figure 5:
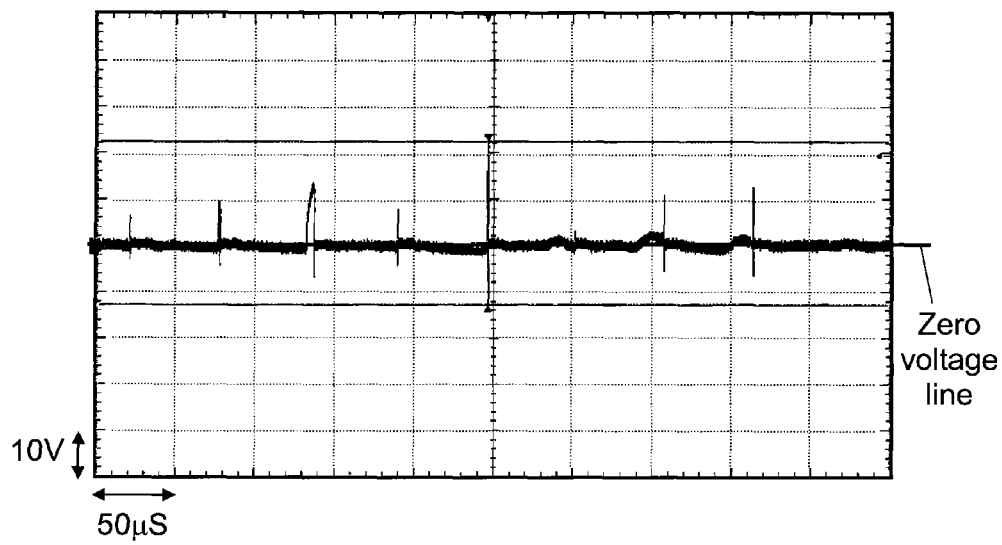
FIG. 5 shows an example of a completely collapsed waveform.
Figure 6:
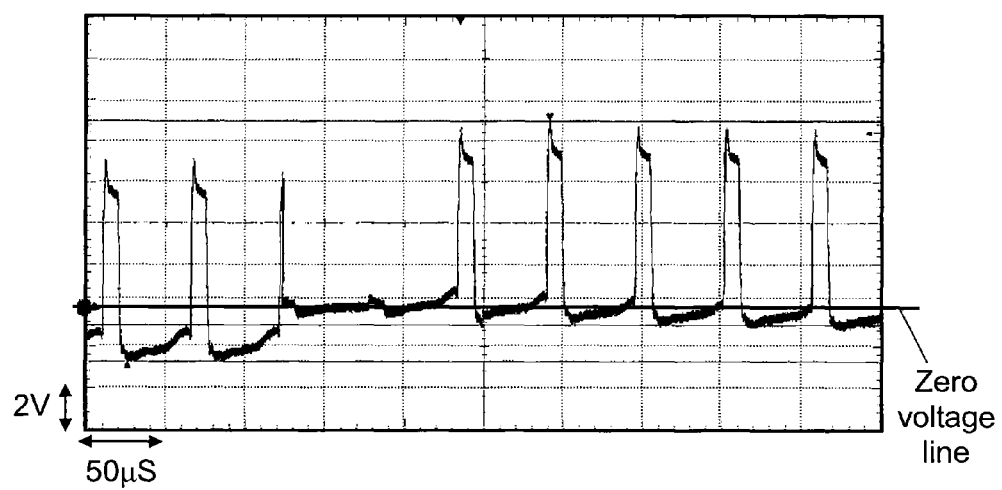
FIG. 6 shows an example of a partially collapsed waveform.
Figure 7:
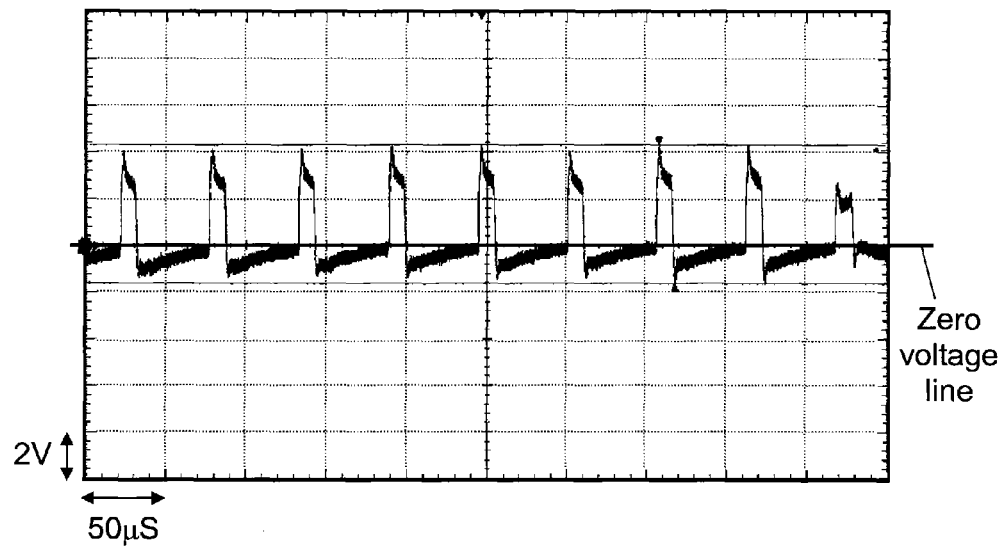
FIG. 7 shows an example of a waveform free from collapse.
Figure 8:
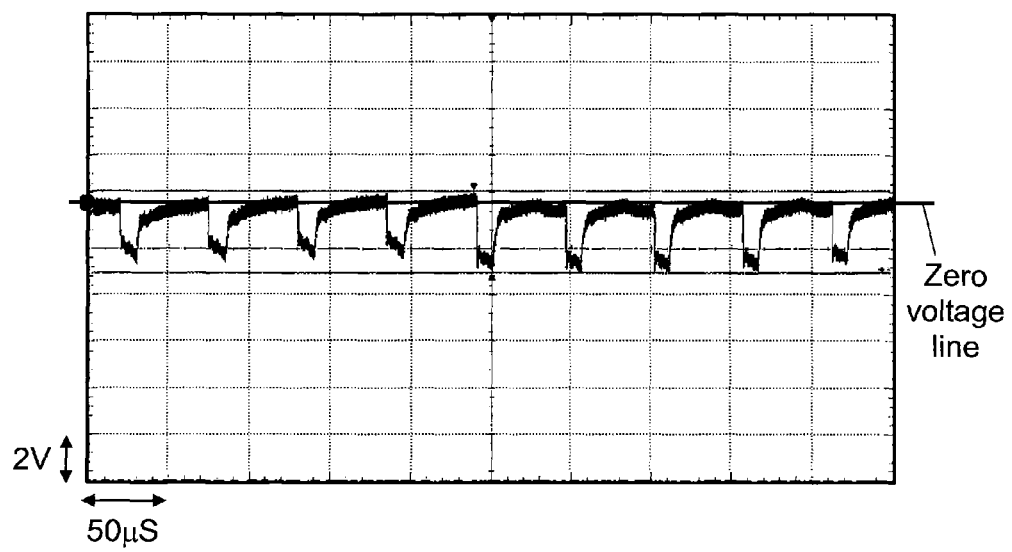
FIG. 8 shows a voltage waveform heading downward from a zero-voltage line.

FIG. 5-FIG. 7 show instances of such waveform collapses. FIG. 5 shows a waveform completely collapsed, FIG. 6 shows a waveform partially collapsed, and FIG. 7 shows a waveform free from collapse. FIG. 8 shows a voltage waveform heading downward from a zero-voltage line. In FIG. 5-FIG. 8, X-axes represent a time in common with a scale of 50 μsec/div. Digital oscilloscope 130 is insulated with insulating transformer 140.

High-voltage differential probe 120 is electrically connected to shaft 16 at (+) side 120a via lead-wire 110 of approx. 30 cm long. This lead-wire is modified this way for the connection: The conductor of the lead-wire is looped to have a diameter of approx. 15 mm, and the inner circumference is brought into conductive contact with the outer wall of shaft 16, so that probe 120 is electrically connected to shaft 16. Probe 120 is also connected to bracket 17 at (−) side 120b via lead-wire 111 of approx. 30 cm long. This lead-wire 111 is conductively connected to bracket 17 at the end with conductive tape 112. The voltage between bracket 17 and shaft 16, i.e. the axial voltage of the bearing on the output shaft side, is measured with the foregoing structure.

The axial voltage of the bearing on the counter output shaft side is measured in a similar manner to what is discussed above. To be more specific, high-voltage differential probe 120 is electrically connected to shaft 16 at (+) side 120a via lead-wire 110 of approx. 30 cm long. This lead-wire is modified this way for the connection: The conductor of the lead-wire is looped to have a diameter of approx. 15 mm, and the inner circumference is brought into conductive contact with the outer wall of shaft 16, so that probe 120 is electrically connected to shaft 16. The (−) side 120b of probe 120 is electrically connected to bracket 19 via lead-wire 111 of approx. 30 cm long. The end of this lead-wire 111 is conductively connected to bracket 19, partially exposed from the resin by cutting the resin in part, by using conductive tape 112.

A direction of the axial voltage is determined whether it is a negative direction or a positive direction based on the heading of the waveform. The voltage waveforms shown in FIG. 5-FIG. 7 head upward from the zero voltage line, so that it can be understood that the electric potential on shaft 16 side (inner ring side of the bearing) is higher than that of shaft 19 side (outer ring side of the bearing). It can be thus determined that the electric current flows from the inner ring side toward the outer ring side of the bearing, and the axial voltage can be expressed as heading the positive direction. To the contrary, as shown in FIG. 8, when the voltage waveform is headed downward from the zero voltage line, it can be determined that the electric current flows from the outer ring side toward the inner ring side of the bearing, and the axial voltage is expressed as heading the negative direction.

Figure 9:
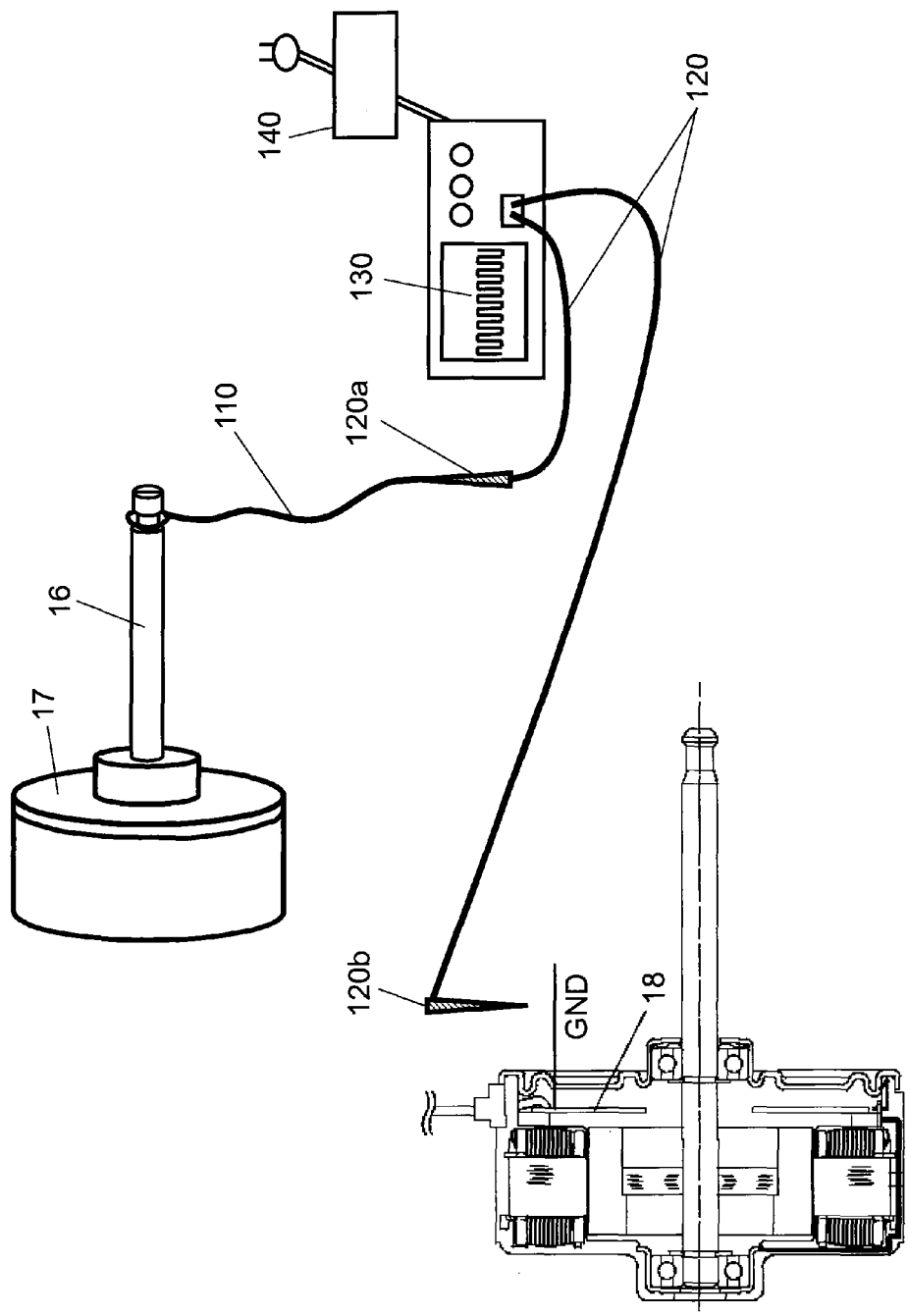
FIG. 9 illustrates a method of measuring a voltage between a ground and a shaft in accordance with a first experiment.

FIG. 9 shows a method of measuring a voltage between ground GND and the shaft in experiment 1. Voltage waveforms are observed with digital oscilloscope 130 (Tektronix Model DP07104) and high-voltage differential probe 120

(Tektronix Model P5205) for measuring a peak-to-peak voltage at 50 μsec as the voltage between ground GND and the shaft.

High-voltage differential probe 120 is electrically connected to shaft 16 at (+) side 120a via lead-wire 110 of approx. 30 cm long. This lead-wire is modified this way for the connection: The conductor of the lead-wire is looped to have a diameter of approx. 15 mm, and the inner circumference is brought into conductive contact with the outer wall of shaft 16, so that probe 120 is electrically connected to shaft 16. Probe 120 is connected directly to ground GND on printed circuit board 18 at (−) side 120b.

To confirm whether or not the foregoing specification has the anti-electric-erosion effect, the two motors are prepared for testing the durability against the electric-erosion. The durability test is done in the following conditions: power supply voltage Vdc of the winding=391V, power supply voltage Vcc of the control circuit=15V, and the rpm of the motors=1000 r/min, the motors in the attitude of keeping the shaft horizontally, ambient temperature=10° C., and no load applied.

To accelerate the electric erosion, six iron-balls out of seven balls of the bearing are replaced with ceramic-balls, and these special bearings are used. The presence of an electric erosion is determined based on a hearing of abnormality and an observation of wavy abrasion inside the bearing. These phenomena tell that the motor comes to the life end due to the electric erosion.

Experiment 2

With a similar structure to what is shown in FIG. 1, dielectric layer 50 employs PBT resin of which dielectric constant is 3.6, and layer 50 is shaped like a cylinder as shown in FIG. 2. The resin is 2.5 mm thick in the radial direction. Capacitor 40 has a capacity of 230 pF. The motor having the foregoing structure is prepared, and an axial voltage and a voltage between the grounding wire and the shaft are measured. These voltages are measured by the same method as used in experiment 1. The anti-electric-erosion effect is confirmed by the same method as used in experiment 1.

Experiment 3

Figure 10:
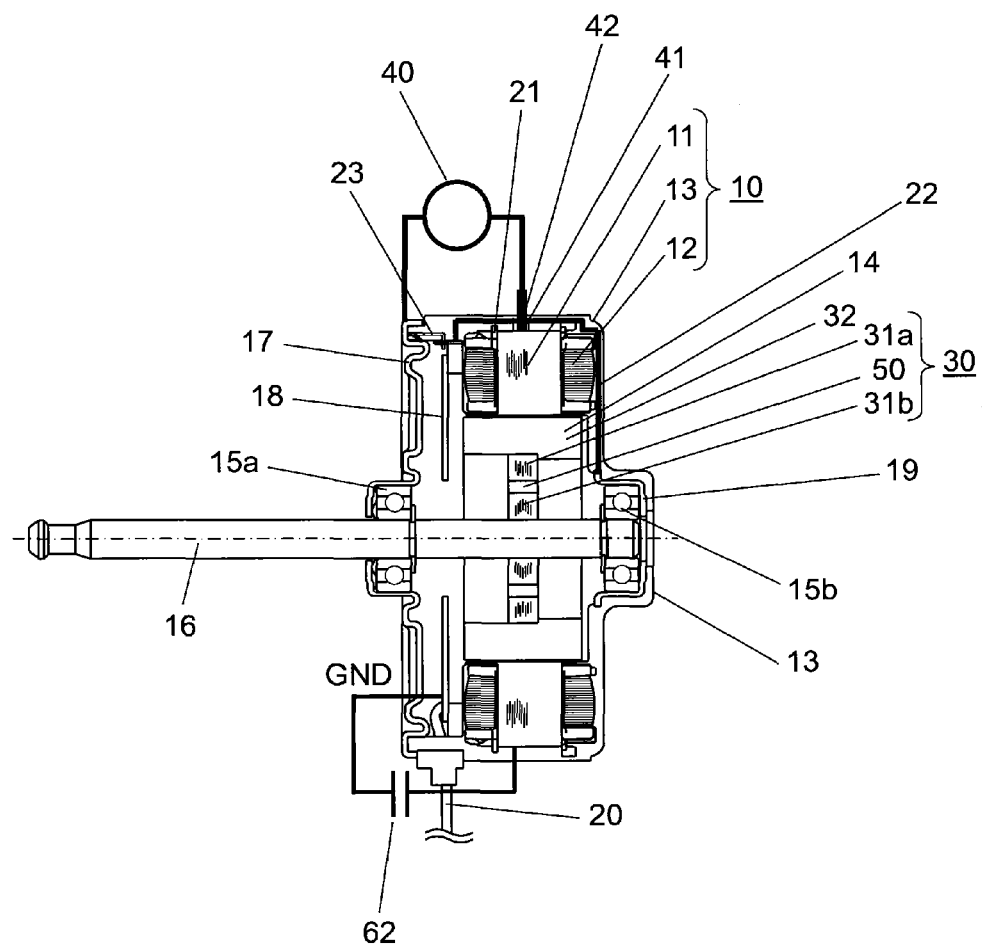
FIG. 10 shows a structure of a motor in accordance with a third experiment of the present invention.

FIG. 10 shows a structure of a motor used in experiment 3. With the structure shown in FIG. 10, dielectric layer 50 employs PBT resin of which dielectric constant is 3.6, and layer 50 is shaped like a cylinder as shown in FIG. 2, and has a thickness of 2.5 mm in the radial direction. Stator iron-core 11 is connected to ground GND on printed circuit board 18 via capacitor 40 of 230 pF and dielectric element 62 employing a capacitor of 0.1 μF.

The axial voltage and the voltage between ground GND and the shaft are measured by the same method as used in experiment 1. The anti-electric-erosion effect is confirmed by the same method as used in experiment 1.

Sample 1 for Comparison

Figure 11:
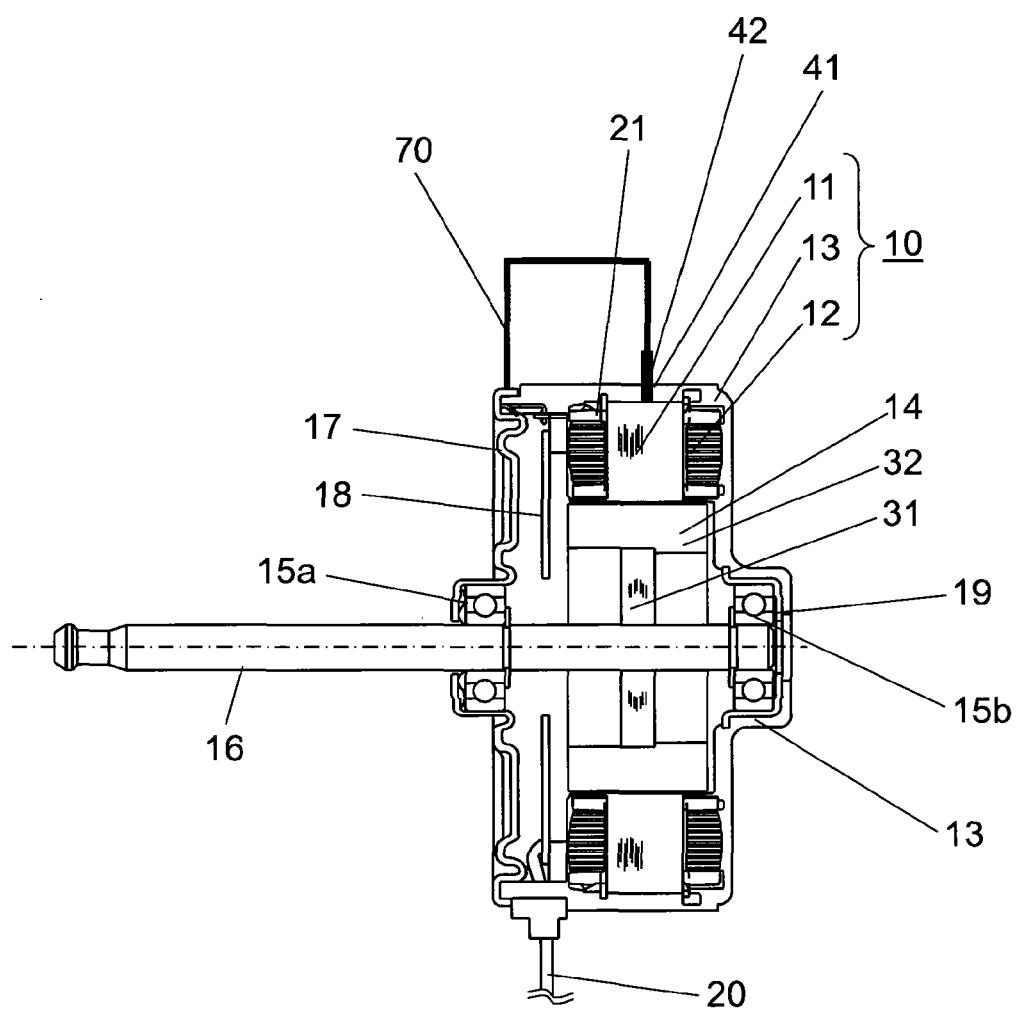
FIG. 11 shows a structure of a motor of comparison sample 1.
Figure 12:
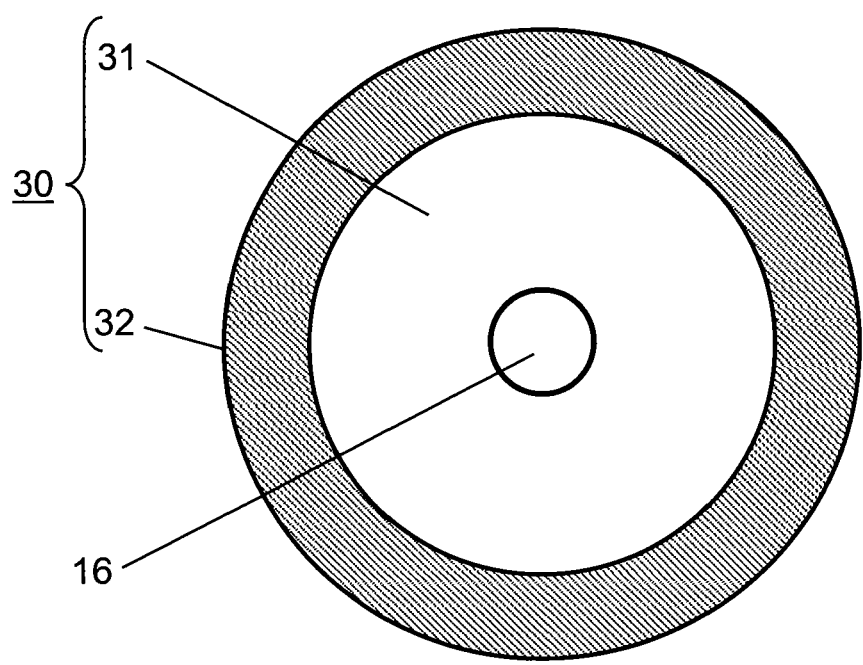
FIG. 12 shows a rotary body made for a comparison purpose and having no dielectric layer.

FIG. 11 shows a structure of the motor used as sample 1 for comparison, and FIG. 12 shows a rotary body having no dielectric layer and made for a comparison purpose. As shown in FIG. 11, bracket 17 is not electrically connected to bracket 19, but bracket 17 is connected to stator iron-core 11 with conductive member 70. The rotary body does not have the dielectric layer as shown in FIG. 12. The axial voltage and the voltage between ground GND and the shaft of this motor are measured. These voltages are measured by the same method as used in experiment 1, and the anti-electric-erosion effect is confirmed by the same method as used in experiment 1.

Sample 2 for Comparison

Figure 13:
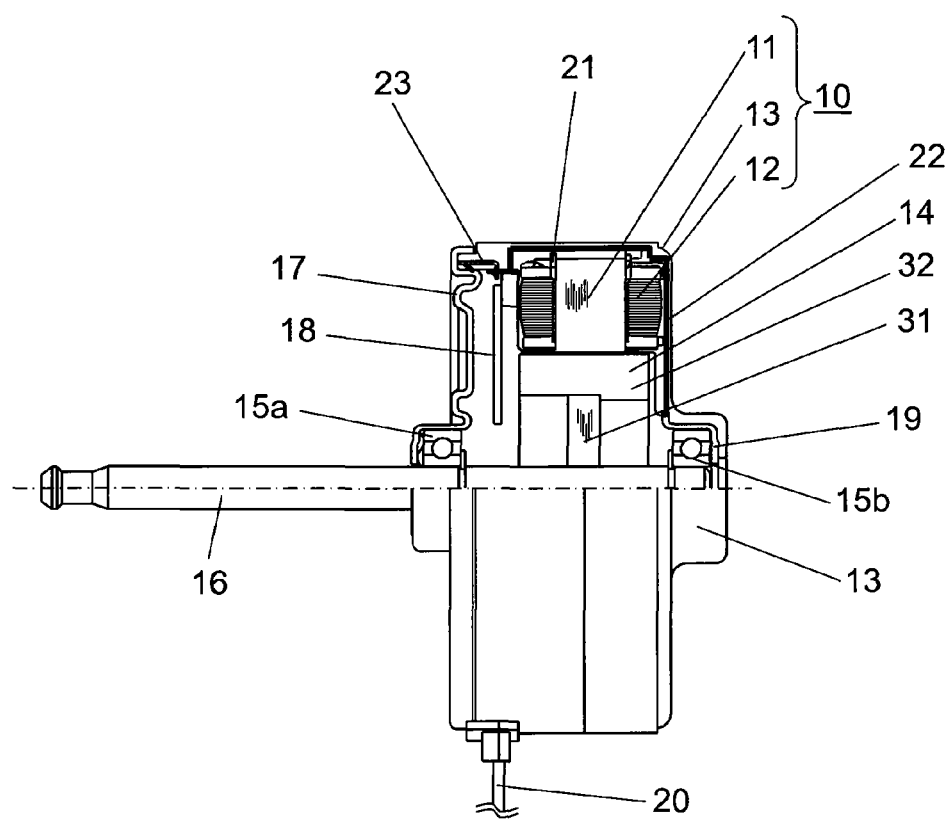
FIG. 13 shows a structure of a motor of comparison sample 2.

FIG. 13 shows a structure of the motor used as sample 2 for comparison. As shown in FIG. 13, bracket 17 and bracket 19 are connected electrically together, but bracket 17 is not connected to stator iron-core 11. The rotary body does not have the dielectric layer as shown in FIG. 12. The axial voltage and the voltage between ground GND and the shaft of this motor are measured. These voltages are measured by the same method as used in experiment 1, and the anti-electric-erosion effect is confirmed by the same method as used in experiment 1.

Sample 3 for Comparison

Figure 14:
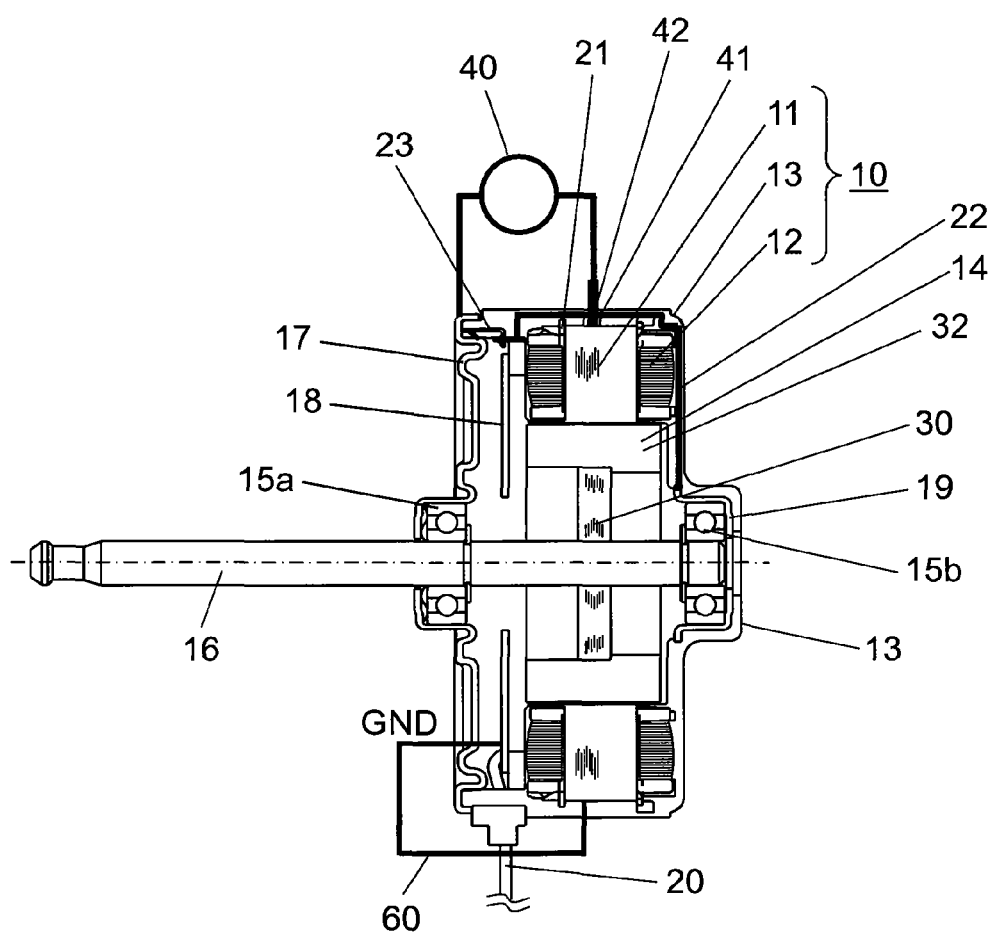
FIG. 14 shows a structure of a motor of comparison sample 3.

FIG. 14 shows a structure of the motor to be used in sample 3 for comparison. As shown in FIG. 14, bracket 17 is electrically connected to bracket 19, stator iron-core 11 is connected to printed circuit board 18 at ground GND via continuity member 60. Rotary body 30 without a dielectric layer as shown in FIG. 12 is used. The motor structured as discussed above is prepared, and stator iron-core 11 is connected to bracket 17 via capacitor 40 having 40 pF, and then an axial voltage and a voltage between ground GND and the shaft are measured.

Figure 15:
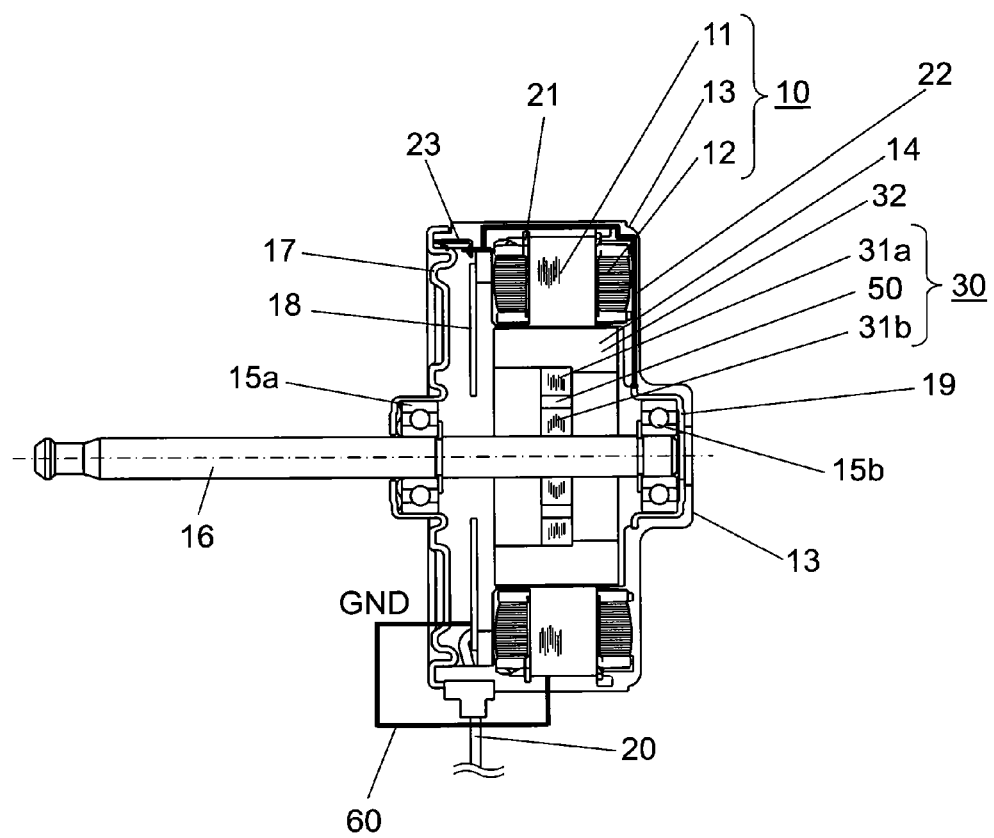
FIG. 15 shows another structure of the motor of comparison sample 3.

FIG. 15 shows another structure of a motor used in sample 3 for comparison. As shown in FIG. 15, nothing is connected between stator iron-core 11 and bracket 17, so that they are in an open state. An axial voltage and a voltage between ground GND and the shaft are measured in this condition. The measuring method and the method for confirming the anti-electric-erosion effect are the same as those used in experiment 1.

FIG. 16 shows evaluations of the respective experiments and samples for comparison. The evaluation includes the following items for samples 1-3 for comparison and experiments 1-3: rough specification of motor, axial voltage of bearing on output shaft side and axial voltage of bearing on counter output shaft side, waveform state of axial voltage, heading of waveform of axial voltage, axial voltage direction relative to reference, i.e. bracket or outer ring side of bearing, voltage between ground GND and shaft, and result of anti-electric-erosion test.

The specifications of sample 1 used in experiment 1, experiment 2, and the result of experiment 2 prove that the axial voltage can be lowered and the voltage direction can be turned to a negative direction, and also, the production of electric erosions can be suppressed by the following structure:

make brackets 17 and 19 conductive, connect stator iron-core 11 to ground GND on printed circuit board 18, provide dielectric layer 50, connect iron-core 11 to bracket 17 via capacitor 40, and adjust the electrostatic capacity of capacitor 40.

The specifications of samples 1, 2 for comparison and the specification of sample 1 of experiment 1 prove that elimination of both of dielectric layer 50 and capacitor 40 or elimination of either one of these makes it difficult to obtain an optimum matching of the impedance on the rotor side and the stator side, so that it is very hard to lower the axial voltage to the minimum level.

The results of samples 1, 2 for comparison and the experiments 1, 2, and 3 prove that the case, where stator iron-core 11 is not connected to ground GND on printed circuit board 18, cannot expect the lowering of the voltage between ground GND and the shaft. When the voltage between ground GND and the shaft stays high, the inner ring and the outer ring of the bearings always stay in a state of high electric potential, so that even a subtle loss in the balance of impedance will cause an unfavorable great axial voltage.

The specification of sample 3 of experiment 1 proves that the case, where the voltage direction is positive, namely, when the electric current flow from the inner ring side toward the outer ring side of the bearing, results in an unfavorable anti-electric-erosion effect although the same axial voltage is used as the voltage direction is negative. This is because the area of ball-transfer-face of the outer ring balls is greater than that of the inner ring balls of the bearing, and an adjustment for the electric erosion to occur on the outer ring side rather than on the inner ring side may suppress the electric erosion more effectively. In other words, the electric potential of the inner ring should be adjusted lower than that of the outer ring so that the electric erosion may be suppressed more effectively.

The result of experiment 3 shown in FIG. 16 proves that the connection via capacitor 40 between stator iron-core 11 and ground GND on printed circuit board 18 does not affect the axial voltage, and this structure resists transmitting high-frequency noises to electrical equipment to which the motor is mounted. Use of capacitor 40 is thus a favorable measure.

Exemplary Embodiment 2

An indoor unit of an air-conditioner is taken as an instance of the electrical equipment of the present invention. The structure of the indoor unit is detailed hereinafter.

Figure 17:
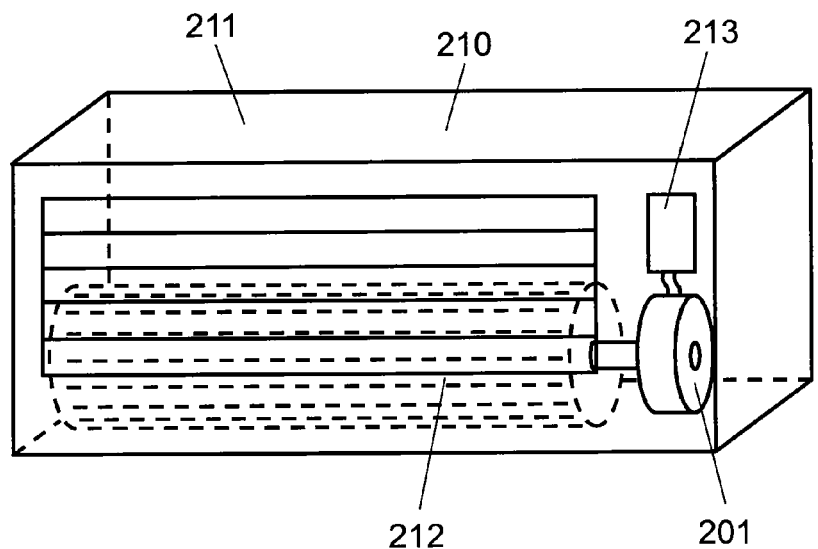
FIG. 17 shows a structure of electrical equipment (indoor unit of an air-conditioner) in accordance with a second embodiment of the present invention.

As shown in FIG. 17, indoor unit 210 is formed of housing 211 and motor 201 placed in housing 211. Cross-flow fan 212 is mounted on a rotary shaft of motor 201. Motor 201 is driven by motor driver 213, which is powered to rotate motor 201, and then cross-flow fan 212 starts rotating. The rotation of cross-flow fan 212 blows the air into a room, where the air is conditioned by a heat exchanger (not shown) working for the indoor unit. Motor 201 employs, e.g. the brushless motor in accordance with the first exemplary embodiment.

The electrical equipment of the present invention thus comprises a motor and a housing in which the motor is mounted. The motor, having the structure previously discussed, of the present invention is employed as this motor of the electrical equipment.

Exemplary Embodiment 3

An outdoor unit of an air-conditioner is taken as an instance of the electrical equipment of the present invention. The structure of the outdoor unit is detailed hereinafter.

Figure 18:
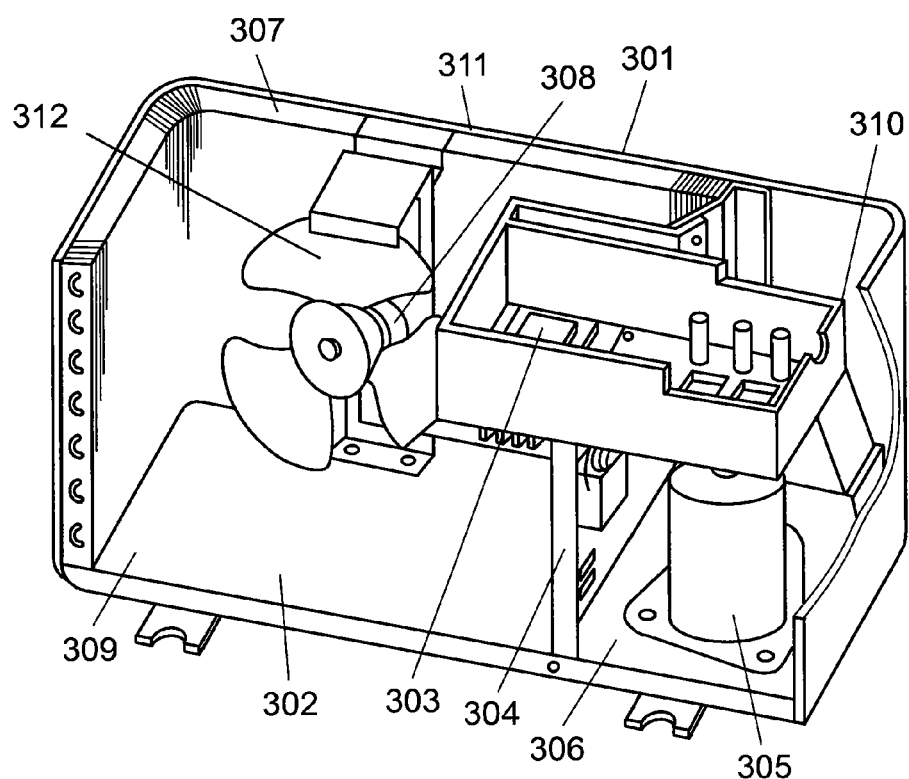
FIG. 18 shows a structure of electrical equipment (outdoor unit of an air-conditioner) in accordance with the third embodiment of the present invention.

As shown in FIG. 18, outdoor unit 301 is formed of housing 311 and motor 308 placed in housing 311. Fan 312 is mounted to a rotary shaft of motor 308, which thus works as a blower motor.

Outdoor unit 301 is divided into compressing room 306 and heat exchanging room 309 by partition 304 standing up on bottom plate 302. Compressor 305 is placed in compressing room 306, and heat exchanger 307 and the blower motor are placed in heat exchanging room 309. Accessory box 310 is placed over partition 304.

Motor driver 303 placed in accessory box 310 drives blower motor 308, and then fan 312 rotates to blow air into heat exchanging room 309 via heat exchanger 307. Motor 308 employs, e.g. the brushless motor in accordance with the first embodiment.

The electrical equipment of the present invention thus comprises a motor and a housing in which the motor is mounted. The motor, having the structure previously discussed, of the present invention is employed as this motor of the electrical equipment.

Exemplary Embodiment 4

A water heater is taken as an instance of the electrical equipment of the present invention. The structure of the water heater is detailed hereinafter.

Figure 19:
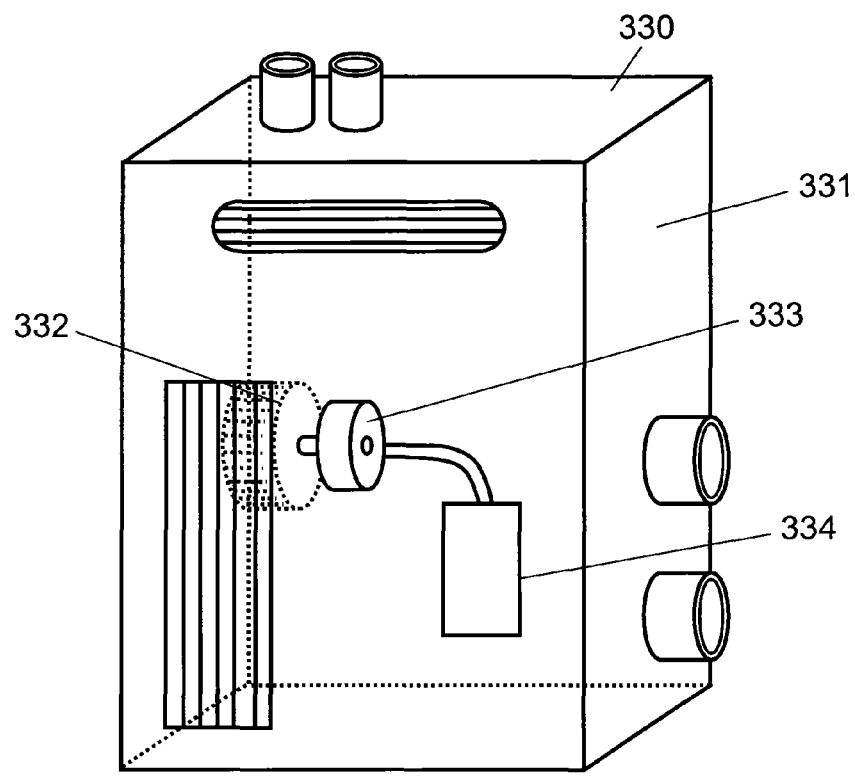
FIG. 19 shows a structure of electrical equipment (water heater) in accordance with a fourth embodiment of the present invention.

As shown in FIG. 19, water heater 330 is formed of housing 331 and motor 333 placed in housing 331. Fan 332 is mounted on a rotary shaft of motor 333, which is driven by motor driver 334. Powering the motor driver 334 allows rotating motor 333, and then fan 332 starts rotating. The rotation of fan 332 allows blowing air necessary for combustion into a fuel carbureting room (not shown). Motor 333 employs, e.g. the brushless motor in accordance with the first embodiment.

The electrical equipment of the present invention thus comprises a motor and a housing in which the motor is mounted. The motor, having the structure previously discussed, of the present invention is employed as this motor of the electrical equipment.

Exemplary Embodiment 5

An air-cleaner is taken as an instance of the electrical equipment of the present invention. The structure of the air-cleaner is detailed hereinafter.

Figure 20:
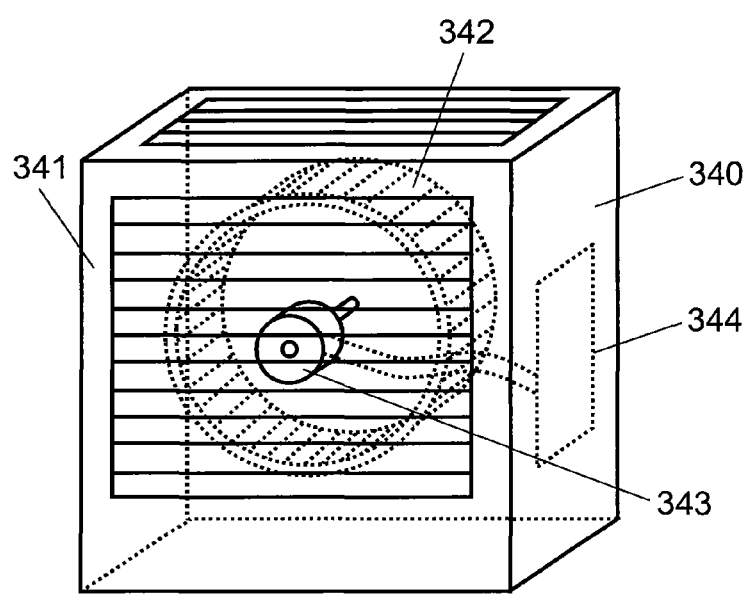
FIG. 20 shows a structure of electrical equipment (air cleaner) in accordance with a fifth embodiment of the present invention.

As shown in FIG. 20, air cleaner 340 is formed of housing 341 and motor 343 placed in housing 341. Air-circulating fan 342 is mounted on a rotary shaft of motor 343, which is driven by motor driver 344. Powering motor driver 344 allows rotating motor 343, and then fan 342 starts rotating. The rotation of fan 342 allows circulating the air. Motor 343 employs, e.g. the brushless motor in accordance with the first embodiment of the present invention.

The electrical equipment of the present invention thus comprises a motor and a housing in which the motor is mounted. The motor, having the structure previously discussed, of the present invention is employed as this motor of the electrical equipment.

The foregoing exemplary embodiments describe the motors used in an indoor unit, an outdoor unit of the air-conditioner, a water heater, and an air cleaner as instances of the electric equipment of the present invention. The present invention can be applied to other motors to be used in various information devices, industrial devices, and other applications.

INDUSTRIAL APPLICABILITY

The motor of the present invention allows lowering the axial voltage, so that it is good at preventing an electric erosion on the bearing. The motor can be used effectively in electric equipment, of which motors are required to be more inexpensive and have a longer service life, such as an indoor unit, an outdoor unit of the air conditioner, a water heater, and an air cleaner.

DESCRIPTION OF REFERENCE SINGS 10 stator
11 stator iron-core
12 stator winding
13 insulating resin
13a motor projection part
14 rotor
15, 15a, 15b bearing
16 shaft
17, 19 bracket
18 printed circuit board 19a cylindrical section
20 connection wire
20g grounding wire
21 insulator
22, 23 conductive pin
30 rotary body
31 rotor iron-core
31a outer iron-core
31b inner iron-core
32 permanent magnet
40 capacitor
41 through-hole
42 connection pin
50 dielectric layer
51 fastening section
60 continuity member
62 dielectric element
70 conductive member
110, 111 lead wire
112 conductive tape
120 high voltage differential probe
130 digital oscilloscope
140 insulating transformer
201, 308, 333, 343 motor
210 indoor unit of air-conditioner
211, 311, 331, 341 housing
212 cross-flow fan
213, 303, 334, 344 motor driver
301 outdoor unit of air-conditioner
302 bottom plate
304 partition
305 compressor
306 compressing room
307 heat exchanger
309 heat exchanging room
310 accessory box
312, 332 fan
330 water heater
340 air-cleaner
342 air-circulating fan

The invention claimed is:

1. A motor comprising:
a stator including a stator iron-core having a winding wound thereon;
a rotor including a rotary body confronting the stator and holding a permanent magnet along a circumferential direction, and a shaft joined to the rotary body such that it extends through the rotary body at the center;
a bearing supporting the shaft;
two conductive brackets fixing the bearing; and
a printed circuit board having a drive circuit mounted thereon for driving the winding,
wherein the rotary body is provided with an inner iron core to be joined to the shaft, a dielectric layer formed by insulating resin around the inner iron core in a manner to surround the inner iron core continuously along a circumferential direction, and an outer iron core disposed on an outer peripheral side of the dielectric layer, further wherein the two brackets are electrically connected together, and an impedance adjusting member is connected between the stator iron-core and the brackets for adjusting impedance.

2. The motor of claim 1, wherein the stator iron-core is electrically connected to a ground on the printed circuit board, wherein the ground is a reference of zero electric potential.

3. The motor of claim 2, wherein the stator iron-core is connected to the ground on the printed circuit board via a dielectric element.

4. The motor of claim 1, wherein the impedance adjusting member is connected between the stator iron-core and the brackets, wherein the brackets are electrically insulated from the stator iron-core.

5. The motor of claim 1, wherein a stator member including the stator iron-core wound with the winding is integrally molded with at least one of the two brackets by insulating resin.

6. The motor of claim 1, wherein the dielectric layer is formed in a manner to encircle the shaft.

7. The motor of claim 6, wherein the outer iron-core and the inner iron-core are rigidly bonded while being kept insulated from each other via the dielectric layer.

8. The motor of claim 1, wherein the impedance adjusting member adjusts impedance between the stator iron-core and either one of the brackets.

9. The motor of claim 8, wherein the impedance adjusting member is a matching member that matches impedance between the stator iron-core and an inner ring of the bearing to impedance between the stator iron-core and an outer ring of the bearing.

10. The motor of claim 9, wherein the impedance adjusting member is at least one of a dielectric element and a resistance element.

11. The motor of claim 8, wherein the bearing includes an outer ring, an inner ring, and iron balls and,
at least one of the dielectric layer and the impedance adjusting member is adjusted such that an electric potential of the inner ring becomes lower than an electric potential of the outer ring when the motor is being driven.

12. The motor of claim 1 further comprising an inverter using a pulse width modulation method for driving the winding.

13. Electrical equipment comprising the motor as defined in anyone of claims 1-12.

* * * * *